July 1, 1958     M. N. McKINNON     2,841,216

AUXILIARY FUEL SYSTEMS FOR AUTOMOTIVE VEHICLES

Filed Nov. 13, 1953

*INVENTOR.*
Malcolm N. McKinnon
BY *Edwin M. Thomas*

ATTORNEY

United States Patent Office 2,841,216
Patented July 1, 1958

2,841,216

AUXILIARY FUEL SYSTEMS FOR AUTOMOTIVE VEHICLES

Malcolm N. McKinnon, Salt Lake City, Utah

Application November 13, 1953, Serial No. 391,905

1 Claim. (Cl. 158—46.5)

The present invention relates to improvements in auxiliary fuel systems for automotive vehicles and the like. It relates especially to fuel systems involving a small emergency fuel tank for supplying fuel when the main supply is exhausted, or unavailable, or unsuitable for use at the moment.

It has been previously suggested that an auxiliary fuel supply be provided to take care of emergencies such as running out of fuel, or to carry a special type of fuel, e. g. for easy starting under extreme weather conditions, etc. Various special purpose systems are known but they are usually somewhat complex or difficult to install and are very seldom used in the more common types of automotive vehicles. For heavier automotive vehicles, special starting tanks have been used frequently, connected in parallel with the main fuel supply. In the prior art suggestions have been made for the installation of emergency or auxiliary tanks within the main tank, to release their contents when the main tank is exhausted, due to negligence or oversight in refilling. While such systems would appear to have some utility, they have never been accepted commercially. They do not avoid certain fairly common types of trouble such as clogged fuel lines, fuel pump failure, and the like, because the emergency or reserve supply of fuel must follow the same passage as the main supply. One object of the present invention is to avoid this deficiency.

A further object of the invention is to simplify the installation of an auxiliary or reserve fuel tank or supply system in the more common types of automotive vehicles. In one form of the invention, this is accomplished by combining a small auxiliary or emergency tank with the air filter which is so commonly mounted directly upon or above the carburetor. In another form, the emergency tank is located just above or adjacent the carburetor, or between the fuel pump and the carburetor at such an elevation as to feed its supply of reserve or special fuel by gravity directly to the carburetor, even when the main fuel line is clogged or the pump is inoperative.

Another object of the invention is to install an emergency or special or reserve fuel system in such a manner that it can be opened or released from the driver's position in the vehicle when the main supply is exhausted or becomes inoperative.

Other objects and advantages of the present invention will become more apparent as specific embodiments thereof are described in detail. For this purpose reference will next be made to the accompanying drawings forming a part of this specification wherein Fig. 1 is an elevational view, largely in section, of an auxiliary fuel system installed in or combined with the air filter unit of common type in modern American automobiles.

Figure 1:
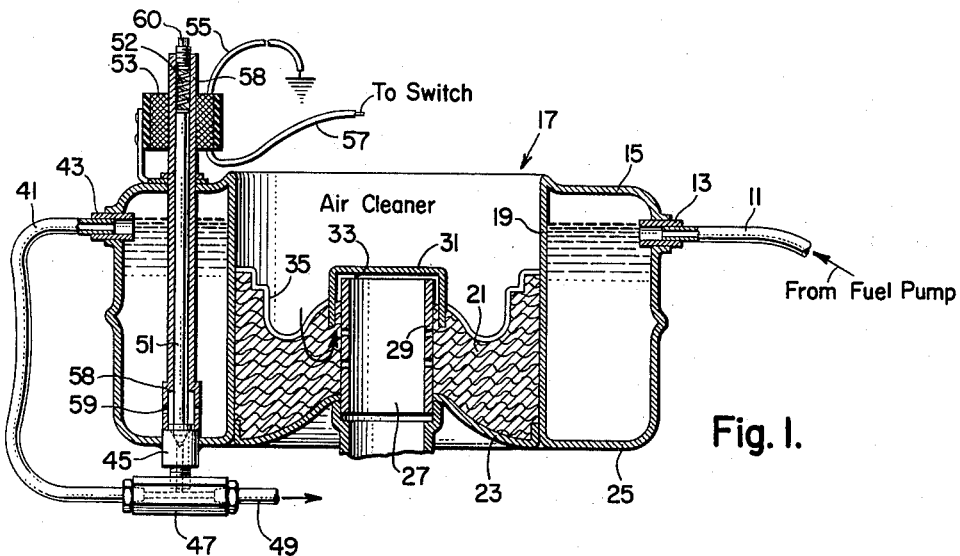

Referring first to Fig. 1, the inlet fuel line from a fuel pump or other equivalent source of major fuel for a vehicle is shown connected by a suitable connection to the auxiliary tank built into an air filter. The line 11 is shown connected by coupling 13 to the upper part of the annular auxiliary fuel tank 15. The latter forms the outer peripheral part or framework of the filter unit indicated generally at 17. The air cleaner or filter unit itself may be of known type, so far as the filtering element per se is concerned, but for the purposes of this invention the annular tank 15 forms the outer shell or framework of the filter. The inner wall member 19 of the tank forms the outer wall of the filter per se. A suitable filter material 21 such as glass fibre, metal strands or the like is supported in such a manner that the air drawn into the carburetor, a fragment only of which is shown below the air cleaner, must pass through the filter material.

In the structure shown in Fig. 1, the filter material is supported upon an impervious annular plate 23 which may be welded to or substantially continuous with the bottom wall element 25 of the tank 15. A central passageway for down flow of air to the carburetor is indicated at 27, formed by an upstanding tube or sleeve member 29 formed in or secured to the plate 23. A cap member 31 is supported above and in annular spaced relation with respect to the sleeve or tube 29, to define the annular passage 33 between them. Member 29 may be perforated as shown. With this arrangement the air passes down through the filter then laterally and upwardly into annular passage 33 and/or through perforations in the member 29, then down the central passage 27 and into the carburetor. Obviously, if desired, the air could be drawn into the bottom of the air cleaner and then turned downwardly so as to reverse its direction of flow but once. With either arrangement, the flow of air by the wall 19 keeps the tank 15 reasonably cool notwithstanding its close proximity to the motor. The cap member 31 may be supported in any suitable manner, e. g. by struts 35 which hold it in proper spaced relation with respect to the cooperating member 29.

The normal outlet line 41, through which the fuel ordinarily passes to the carburetor, leaves the top of the tank 15, to which it is connected by a coupling 43, and bends downwardly. Another outlet 45 is provided at the bottom of tank 15 which connects to a T 47 connected to line 41. The outlet 45 is normally closed, having a conical valve seat which cooperates with a vertically movable needle valve member 51. The latter normally rests in the valve seat by gravity. A spring 52 is preferably provided to hold the valve firmly closed so that the tank 15, which in effect is part of the main fuel line, is normally full. Fuel is fed in at the top and withdrawn at the top.

A solenoid 53 is provided on top of the tank 15. It is adapted, when energized, to lift the valve member 51 against the force of gravity and of the spring 52 just mentioned. The stem of valve 51 or an armature member attached thereto is lifted to open the valve when the solenoid 53 is actuated. One terminal of the solenoid winding is grounded at 55 and the other leads to a switch which is not shown but which is located at a point convenient to the vehicle operator. Closing of the switch of course energizes the solenoid and opens the valve. The latter lead is shown at 57.

A sleeve member 58 preferably surrounds the valve stem 51 and is provided with openings 59 through which fuel may flow to the valve. In some cases it may be omitted and it is not shown in Fig. 2 but it is preferably employed to prevent leakage around the valve stem at the top, since the stem must be movable. As shown, the sleeve 58 extends up through the top of the tank and through the solenoid, being closed at the top by a screw plug 60 so as to completely enclose the valve stem. The sleeve is of non-magnetic material so as not to interfere with the lifting of the armature by the solenoid. Plug 60 compresses the spring 52 to hold the valve normally closed.

Figure 2:
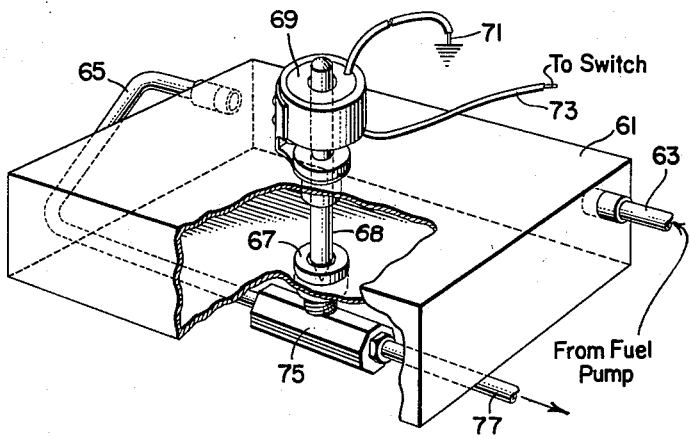
Fig. 2 is a perspective view of a different modification wherein the auxiliary tank is installed between the fuel pump and the carburetor of a common type of modern vehicle.

Referring next to Fig. 2, there is shown an auxiliary or emergency tank 61 connected to the feed line from a fuel pump to a carburetor. The line from the pump, indicated at 63, leads into a top part of the tank as is the case with line 11 in Fig. 1. The normal outlet line 65 connects to the top part of the tank 61 so that the tank normally remains full. A bottom outlet 67 has a conical bore fitted with a needle valve 68 normally held closed by a spring. A solenoid 69 is provided for opening the valve, one terminal of its windings 71 being grounded and the other terminal 73 leading to a switch and battery.

The bottom outlet 67 leads to a T 75 which connects to outlet line 65. The other terminal of the T connects to a line 77 leading to the carburetor. When valve 68 is lifted to open position, the fuel in tank 61 flows by gravity directly to the carburetor, as in the case of Fig. 1. The tank 61 is mounted in any suitable manner at a level above and preferably close to the carburetor so as to provide for ready flow by gravity in the manner just mentioned.

Figure 3:
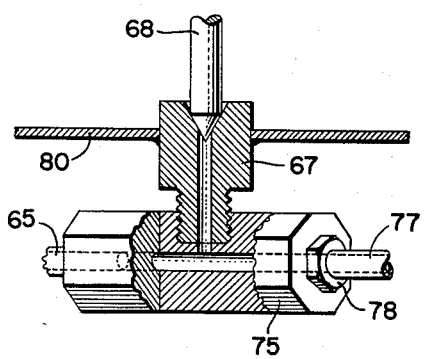
Fig. 3 is an enlarged detail view of the outlet valve and connection used in either of the embodiments, Fig. 1 or Fig. 2.

Fig. 3 shows on a larger scale the bottom outlet connection used in either of the arrangements of Fig. 1 or Fig. 2. The lead 65 as shown is the same as the lead 65 of Fig. 2 but corresponds to the lead or line 41 of Fig. 1 also. The T 75 and the outlet line 77 are the same as in Fig. 2. The T is connected to the outlet 67 attached in any suitable leak-tight manner to the bottom of the tank, shown fragmentarily at 80, by means of a sleeve or threaded connector 78, as will be obvious to those skilled in the art.

When a vehicle runs out of fuel, due to carelessness or inattention of the driver, the auxiliary tank 15 or 61 holds enough to take the vehicle several miles to a point where the fuel can be replenished. In case the fuel line becomes clogged, the auxiliary tank can be cut into run the vehicle at least a short distance until repairs can be made and the same is true in case of failure of the fuel pump.

It is preferable to so arrange the switch which is used to energize the valve-opening solenoid so that it cannot be accidentally operated, so that the auxiliary or emergency tank will always be full. However, even if the auxiliary tank is opened, it will be refilled in the normal operation of the vehicle (or motor) if there is sufficient fuel in the main tank to replenish the auxiliary. In all cases the valve in the bottom of the auxiliary tank is to remain closed except when intentionally opened and held open by operation of the solenoid. The operating switch, in any case, should be one that normally springs open except when held closed, as will be obvious in view of the above discussion.

The invention described has the advantage that it is never inadvertently empty when needed. While a primary purpose is to have available a reserve supply of fuel at all times to take care of emergencies the invention can also be used, by bypassing the fuel line from pump to carburetor, to hold a special grade of starting fuel. Thus line 11 can be connected with a by-pass to line 41 in Fig. 1, placing a valve, e. g. a three way valve at the outlet from the tank and junction of the bypass line with line 41, so that fuel may be drawn either through or around the tank 15, as desired. This arrangement is not illustrated, being obvious to those skilled in the art and in view of the above.

Various other modifications will suggest themselves to those skilled in the art and it will be understood that it is intended to cover such modifications in the following claim, so far as consistent with the spirit of the invention and as permissible by the prior art.

What is claimed is:

An emergency fuel supply apparatus comprising a tank adapted for insulation between the normal fuel supply and carburetor of an internal combustion engine, said tank embodying spaced concentric inner and outer walls providing a fuel chamber therebetween and a central air chamber through which air passes to the carburetor of the engine, cooling said inner wall of said fuel chamber maintaining the fuel in said fuel chamber cool, a pipe connected with said fuel chamber adjacent to the top thereof through which fuel is normally fed to the carburetor of the engine, mechanism including a solenoid operated valve for releasing fuel into said fuel line from a point adjacent to the bottom of said tank independently of the normal flow of fuel from said tank.

References Cited in the file of this patent

UNITED STATES PATENTS

| | | |
|---|---|---|
| 1,015,420 | Bumann | Jan. 23, 1912 |
| 2,007,358 | Anger | July 9, 1935 |
| 2,167,961 | Sachs | Aug. 1, 1939 |
| 2,313,657 | Marshous | Mar. 9, 1943 |
| 2,485,701 | Cristofoni et al. | Oct. 25, 1949 |
| 2,521,576 | Fresolone | Sept. 5, 1950 |
| 2,531,847 | Haley | Nov. 28, 1950 |
| 2,727,715 | Tuthill | Dec. 20, 1955 |